Patented Nov. 27, 1928.

1,693,065

UNITED STATES PATENT OFFICE.

ALFRED H. WHITE, OF ANN ARBOR, MICHIGAN.

PROCESS OF NEUTRALIZING THE ALKALINITY OF WATER.

No Drawing.    Application filed December 7, 1925.  Serial No. 73,900.

My invention relates to a process of neutralizing the alkalinity of water, so as to render it unobjectionable for use in boilers without resultant impairment because of scale accumulation, as well as rendering it satisfactorily available for domestic use. I am aware of previous efforts along this line which have been based upon the use of sulphuric acid, and whose results have proved more or less unsatisfactory because of the very strength of the same, often resulting in corrosion of the boilers or other metal parts with which it is brought into contact, if even a slight excess over the proper proportion has been used. The process herein disclosed is directed both to the treatment of water that is naturally alkaline and to that whose reaction after such softening processes as to well-known zeolite process or the lime and soda process still remains alkaline, and which without additional treatment tends to make the confining metal surfaces brittle, as well as being itself peculiarly liable to foaming and priming.

In carrying out my improved process, I make use of phosphoric acid, which is a relatively feeble acid, and in dilute solution actually forms a protective coating on steel and similar surfaces. Phosphate of lime and phosphate of iron being both highly insoluble, a minimum of soluble salt is left in the solution.

Carbonates are objectionable in water designed for steam boiler use because they develop alkalinity due to hydrolysis, which may be expressed as follows:

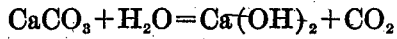

Since the $CO_2$ is continually removed by vaporization, the reaction progresses until a material alkalinity results whereas if there is a small excess content of phosphoric acid, there can be no alkalinity. If normal calcium phosphate is the initial product and there is no excess of acid, the relatively small resultant hydrolysis probably effects the development of a basic salt of such indefinite composition, that the reaction is frequently written in the simple form:

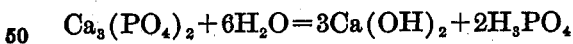

This hydrolysis must, however, come to an end after a very small concentration of hydroxyl ions has taken place, because the phosphoric acid is non-volatile, and an equilibrium is soon reached.

Water which has been softened by the use of soda ash or the zeolite process is, as heretofore stated, frequently alkaline, with sodium carbonate or bicarbonate. The latter is quickly converted to normal carbonate, upon entering the steam boiler, and the former is, more slowly it is true, converted into caustic soda hydrolysis, according to the equation:

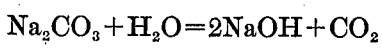

and since the $CO_2$ is constantly removed by the steam as it is formed, a very considerable degree of caustic alkalinity results.

The addition of phosphoric acid or an acid phosphate to these normally or derivatively alkaline waters, however, serves to prevent such an accumulation of alkalinity, since the hydrolysis of sodium phosphate is slight and reaches equilibrium quickly, because of the non-volatile character of phosphoric acid. The sodium phosphate would react with any soluble lime salt which might have passed the zeolite softener, and would thus constitute an added safeguard against the formation of a hard scale within the boiler.

Of course the proportionate quantity of phosphoric acid or acid salt of phosphoric acid used must vary with the degree to which the objectionable content is present in the water used. In general, however, it may be stated to be such that the residual acidity, after the reaction has come to an end and the carbon dioxide has been removed, shall not be much, if any, greater than that given by a solution containing one-half of one per cent of phosphoric acid.

It may be more economical, and is feasible without destroying the benefits of my invention, to neutralize part of the alkalinity by sulphuric or other strong acid and complete the neutralization by the weaker phosphoric acid, so that any residual free acid will be the phosphoric acid which tends to form a protective coating on steel, rather than the corrosive sulphuric acid.

What I claim is:

1. The process of neutralizing the alkaline content of water, consisting in commingling therewith a quantity of phosphoric acid adequate to reduce its final acidity, after reaction and removal of its carbon dioxide content, to a proportion not in excess of one half of one per cent.

2. The process of neutralizing the alkalinity of water containing carbonates, which consists in mingling therewith a quantity of phosphoric acid bearing a predetermined relation to the initial carbonate content thereof, and expelling the resultantly liberated carbon dioxide by boiling until the water has become substantially neutral.

3. The process of neutralizing the alkalinity of water containing alkaline carbonates in solution, which consists in mingling therewith such proportion of phosphoric acid as will decompose the carbonates and cause the formation of soluble phosphates, and expelling the carbon dioxide by boiling until a maximum of approximately one half of one per cent of free phosphoric acid remains in solution upon the completion of the reactions.

4. The process of preventing the development of alkalinity in water during evaporation due to hydrolysis of suspended carbonates and removal of carbon dioxide with the water vapor, which consists in adding to the water a sufficient quantity of phosphoric acid to liberate the hydrolyzable carbon dioxide, and then driving from it the resultantly liberated carbon dioxide.

In testimony whereof, I sign this specification.

ALFRED H. WHITE.